Dec. 29, 1936.   C. J. DU BRUL ET AL   2,065,888
MACHINE FOR ASSORTING ROUND AND CYLINDRICAL ARTICLES
Filed July 23, 1932   5 Sheets-Sheet 2

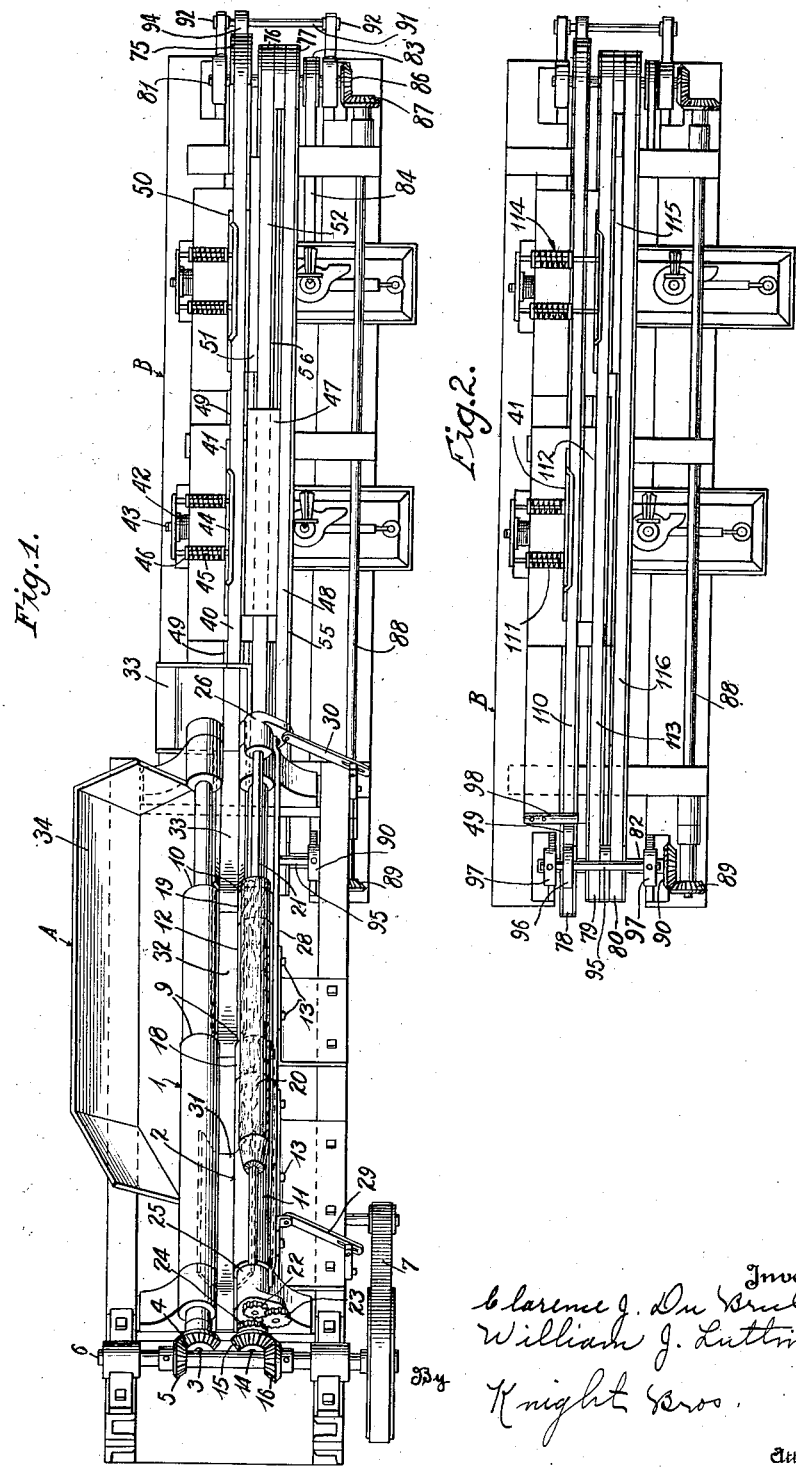
Dec. 29, 1936.　　C. J. DU BRUL ET AL　　2,065,888
MACHINE FOR ASSORTING ROUND AND CYLINDRICAL ARTICLES
Filed July 23, 1932　　5 Sheets-Sheet 1

Dec. 29, 1936.  C. J. DU BRUL ET AL  2,065,888
MACHINE FOR ASSORTING ROUND AND CYLINDRICAL ARTICLES
Filed July 23, 1932  5 Sheets-Sheet 3
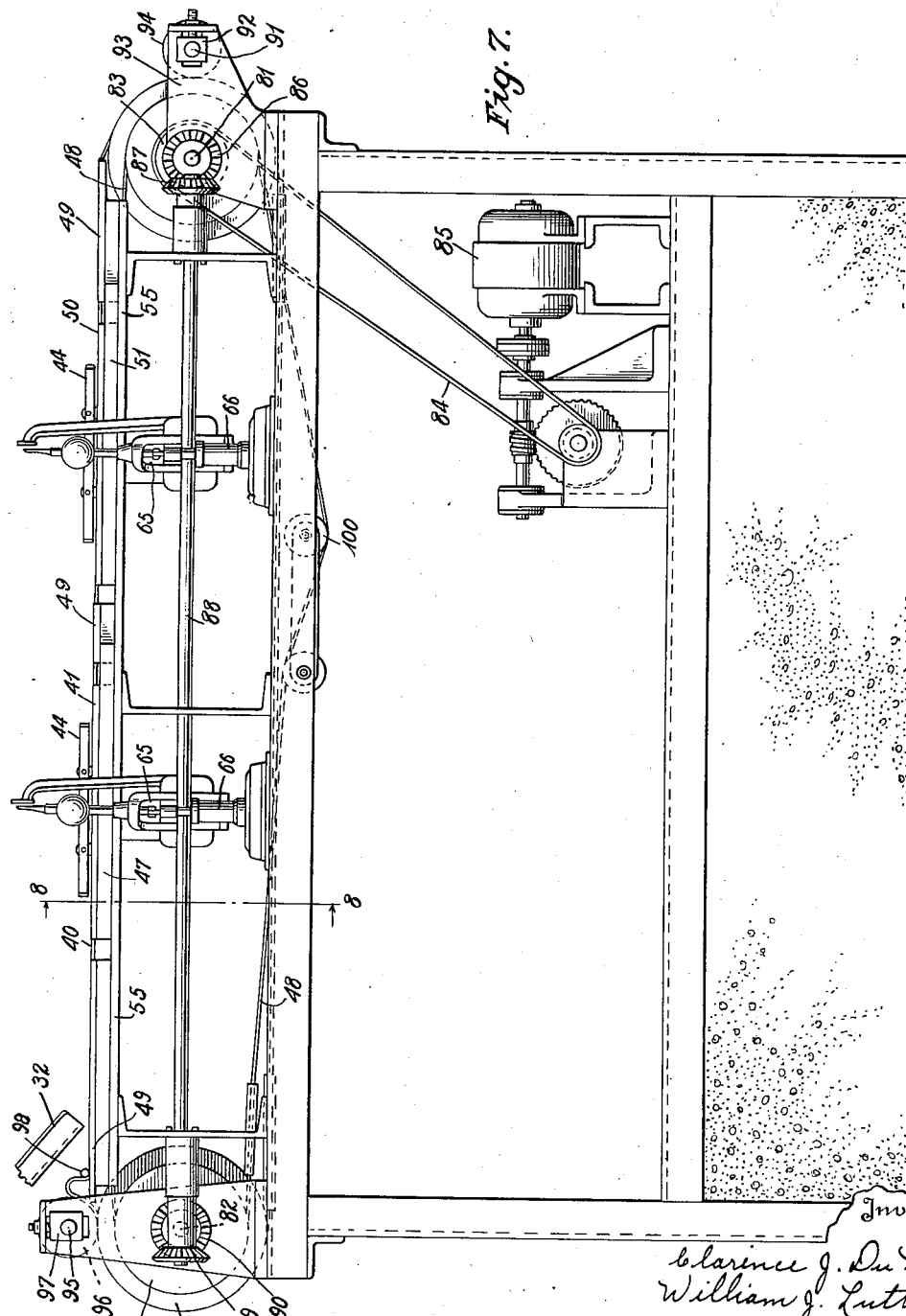

Dec. 29, 1936.   C. J. DU BRUL ET AL   2,065,888
MACHINE FOR ASSORTING ROUND AND CYLINDRICAL ARTICLES
Filed July 23, 1932   5 Sheets-Sheet 4

Inventors
Clarence J. Du Brul
William J. Luttmann
By Knight Bros.
Attorneys

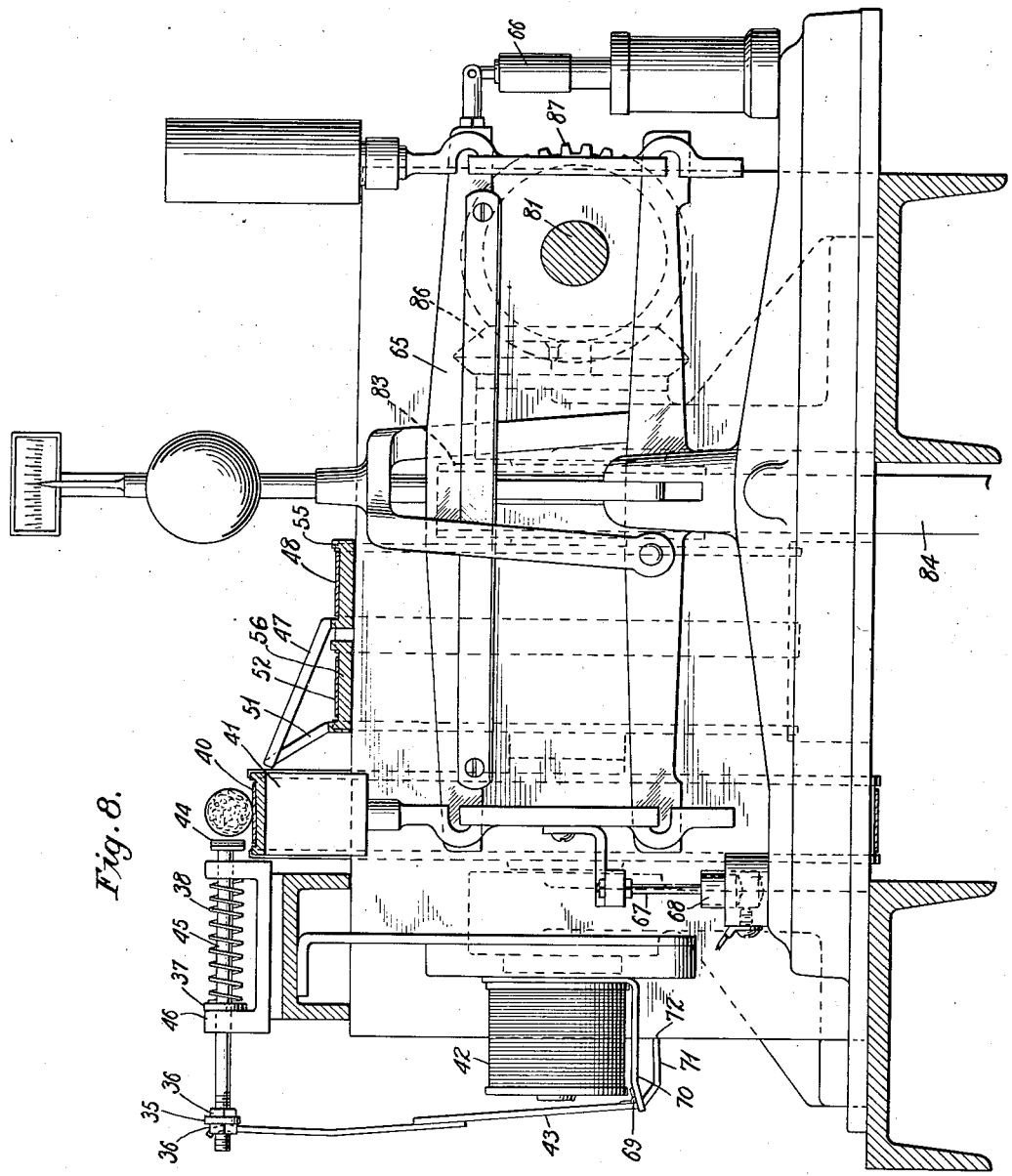

Patented Dec. 29, 1936

2,065,888

UNITED STATES PATENT OFFICE 2,065,888

MACHINE FOR ASSORTING ROUND AND CYLINDRICAL ARTICLES

Clarence J. Du Brul and William J. Luttmann, Cincinnati, Ohio, assignors to The Miller, Du Brul & Peters Mfg. Co., Cincinnati, Ohio, a corporation of Ohio Application July 23, 1932, Serial No. 624,298

6 Claims. (Cl. 209—121)

This invention relates to a machine for assorting round or cylindrical articles according to their diameter, shape, weight and denseness by a combination of mechanisms for separating the articles into groups of certain uniform diameters and weights. The combined diameter and weight classification gives a further classification according to denseness, provided the articles are round, or cylindrical and of definite length.

The machine can be used for determining the smoking characteristics of cigars which are dependent upon their denseness. By eliminating over weight and under weight cigars, as well as those which are over or under size, or bumpy, or tapered, a product having uniform smoking characteristics is obtained. The process of classifying cigars in this way is described in a copending application of C. J. Du Brul, Serial Number 624,299, filed July 23, 1932.

Instead of classifying finished cigars, the bunches may be classified before they are wrapped to insure a uniform product going to the wrapping table. This avoids a waste of wrapper tobacco which occurs when defective bunches are wrapped along with the standard ones. The process of classifying bunches before they are wrapped is described in another copending application of C. J. Du Brul, Serial Number 558,129, filed August 19, 1931.

The above are only examples of processes which can be carried out by this machine.

In the accompanying drawings we have shown two illustrative forms of the invention.

Figure 3:
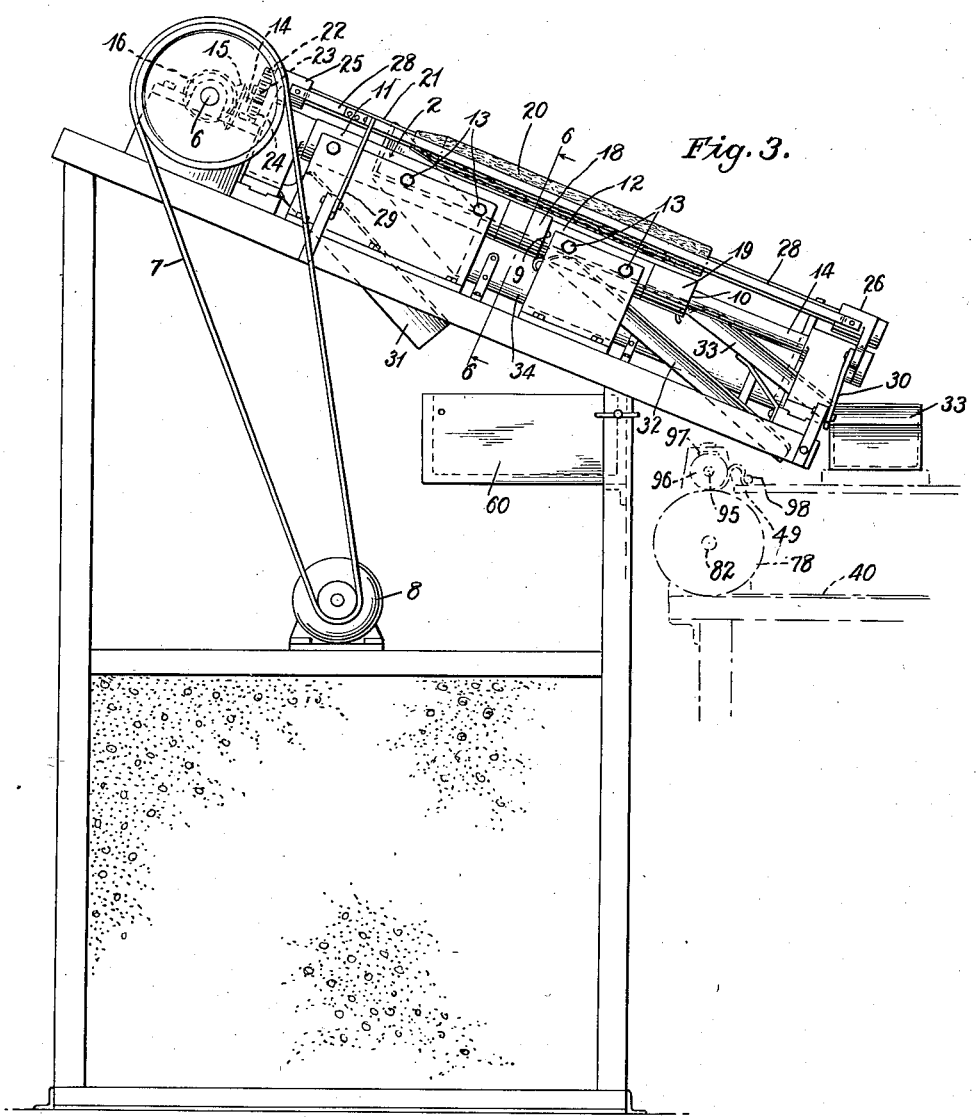
Figure 4:
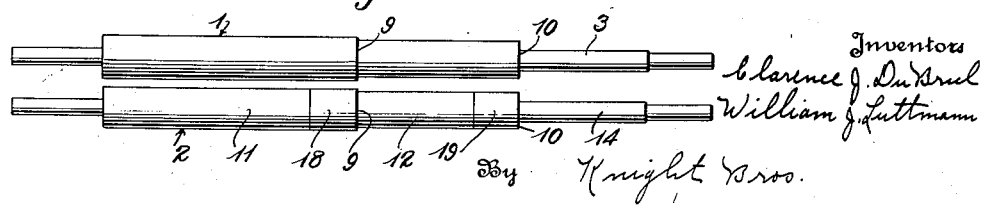
Figure 5:
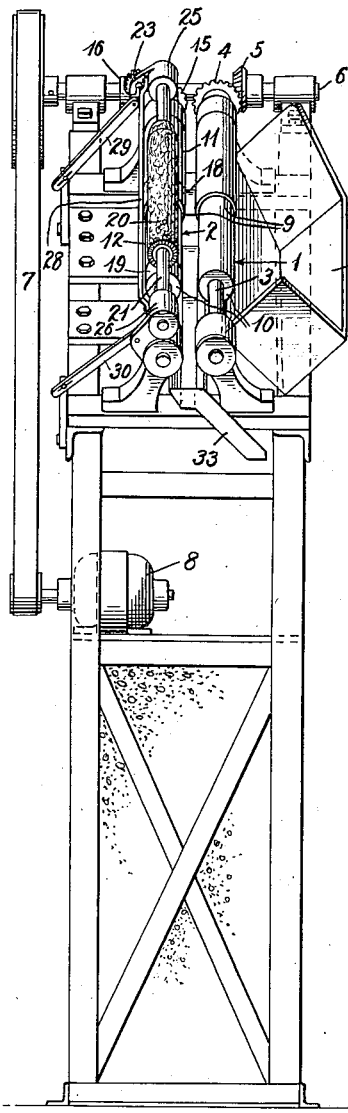
Figure 6:
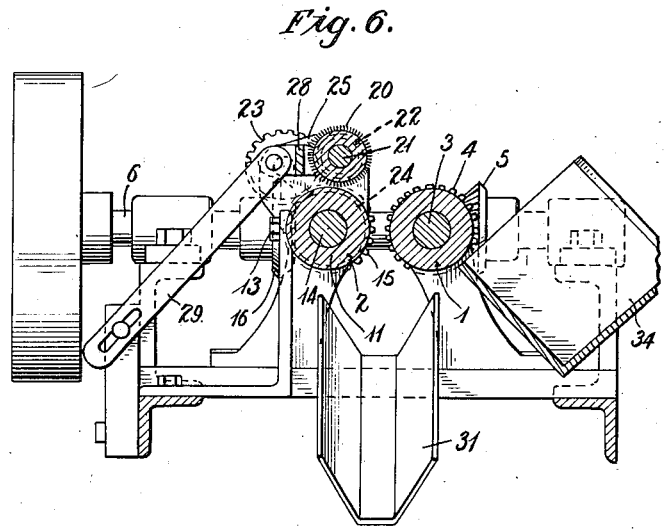

Fig. 1 is a somewhat diagrammatic plan view of one form of the apparatus,

Fig. 2 is a plan view of another arrangement of the weighing machine, showing in detail the left end which is obscured by the diametral testing machine in Fig. 1 and which is the same in both figures, Fig. 3 is a side elevation of the diametral testing machine, showing also a portion of the left end of the weighing machine, Fig. 4 is a diagrammatic plan view of the gauging rollers of the diametral machine, Fig. 5 is a front elevation of the diametral machine, Fig. 6 is a section on the line 6—6 of Fig. 3, Fig. 7 is a side elevation of the weighing machine, and Fig. 8 is a transverse section of the weighing machine on the line 8—8 of Fig. 7.

The diametral selecting machine indicated generally by the character A in the drawings comprises a pair of spaced rolls 1 and 2. The roll 1 is fixed upon a shaft 3 which is driven through beveled gears 4, 5, shaft 6, and belt 7 from an electric motor 8. The roll 1 is decreased in diameter at steps 9 and 10, the intermediate portions being cylindrical.

The roll 2 is partly composed of stationary sections 11 and 12 fixed by screws 13 to the frame of the machine. Within these stationary sections is rotatably mounted a shaft 14 driven by beveled gears 15, 16 from shaft 6. Rotating sections 18 and 19 of the roll 2 are fixed upon shaft 14 so as to rotate therewith, for a purpose to be presently described. The roll 2 has steps 9 and 10 corresponding to those of the roll 1.

Above the roll 2 is a third roll 20 fixed upon a shaft 21. This shaft is driven by gears 22, 23, 24, the latter fixed upon shaft 14, in the same direction as sections 18 and 19 of roll 2. Shaft 21 is rotatably mounted in bearings 25, 26 pivotally supported on shaft 14. These bearings are secured together by a bridge piece 28 and are held in adjusted position by braces 29, 30.

The rolls 1 and 2 are inclined downwardly toward the right. The articles to be tested are dropped onto the upper left end of the rolls and, if they are cylindrical articles, they usually assume a position parallel to the rolls. If the articles to be tested are round, the inclination of the rolls would be very slight, instead of the considerable inclination shown in Fig. 3. Articles which are of less than standard diameter drop through the slot between the upper ends of the rolls and are carried off by chute 31 into a box 60. Articles of greater diameter are moved by the rotation of roll 1 and gravity toward the right and pass over the shoulders 9 to the next section of the rolls. Here the articles of standard diameter drop through and are conveyed by a chute 32 to the weighing machine. Oversized articles continue their movement along the rolls and pass over the shoulders 10, where they drop through into chute 33 and are carried off. In the case of substantially cylindrical articles, those which are in part of small enough diameter to drop between the rolls at the upper end, but which are prevented from doing so by a tapered shape or a lump assume an upright position and are carried down the rolls in that way until they reach section 18 of roll 2. At this point the combined action of the three rotating rolls 1, 18, and 20 lifts the article clear of the rolls and throws it into trough 34. Articles assuming an upright position in the next section of the rolls, because of tapered or lumpy shape, encounter similar treatment at the rotating section 19. The undersized articles, the oversized articles, and the tapered or lumpy articles may be collected separately to give an indication of the proportion of articles having the various defects in size and shape. The roller 20 can be adjusted toward or away from the slot between the rolls 1 and 2 to insure perfect ejection of tapered and lumpy articles. This roll 20 is preferably provided with a cover of plush, or other suitable material to increase the friction at its contact with the defective articles.

The articles of standard size and shape dropping into chute 32 are guided to the weighing machine indicated generally by the character B. The articles are first led onto a conveyor 40 which travels over a stationary supporting trough 49. Portions of the trough 49 are cut out to make spaces for scale pans 41 and 50, which are also trough shaped and are, in effect, continuations of the trough 49. Each scale pan 41 and 50 is carried on a rocking beam 65, the opposite end of which is controlled by a dash pot 66 to avoid oscillation of the rocking beam. The scale may be of any suitable construction, but the one shown by way of example in the drawing is a well known form of torsion balance. The two scales and the mechanisms controlled by them are the same and a description of one will suffice for both. At the scale pan end of the rocking beam are mounted two contacts 67 cooperating with mercury-containing pockets 68. The mercury-containing pockets are insulated from each other, but contacts 67 are electrically connected. The mercury pockets are connected in a circuit with a solenoid 42, which circuit is completed when contacts 67 dip into the mercury pockets. Articles which are oversize depress the scale pan 41 sufficiently to cause contacts 67 to dip into the mercury in pockets 68, thereby completing the electric circuit through a solenoid 42. Armature 43 pivotally mounted at 69 on stationary arms 70 has a swinging movement limited in outward direction by the abutment of the inwardly bent end 71 of the armature against the frame of the machine at 72. In a bracket 46 are slidably mounted rods 45 carrying at one end a kicker 44 and at the other end a bar 35 held in adjusted position by nuts 36. Armature 43 is extended upward to engage the bar 35. Between fixed collars 37 on rods 45 and one arm of each bracket 46 are coil springs 38 which normally hold the kicker toward the left (Fig. 8). When the electric circuit is closed through solenoid 42 the armature 43 is drawn in and moves the kicker 44 across conveyor 40. The article which is on the scale at the moment is thus pushed off conveyor 40 and slides down a chute 47 onto another conveyor 48 arranged a little below the conveyor 40 and supported by a trough 55. Articles of standard or too-light weight do not depress the scale pan 41 sufficiently to close the electric circuit and so are carried on by conveyor 40. They arrive above the scale pan 50 of the second torsion balance, which is set so that its scale pan is depressed to close the electric circuit of the second solenoid by the weight of lighter articles, namely articles of standard weight. There is associated with the scale pan 50 another kicker 44 just like the one first described and operated in the same manner. The standard weight articles are kicked off the conveyor 40 at this point and are guided by a chute 51 onto a third conveyor 52 supported on a trough 56. The under weight articles are carried on by conveyor 40 and discharged over its end. The standard and over weight articles are separately collected at the ends of conveyors 52 and 48.

The conveyors 40, 48 and 52 are trained over pulleys 75, 76, and 77 at the discharge end and pulleys 78, 79, and 80 at the receiving end. These two sets of pulleys are mounted respectively on shafts 81 and 82. The shaft 81 carries a fixed pulley 83 driven by belt 84 through suitable gearing from a power source such as electric motor 85. At one end of shaft 81 beveled gears 86, 87, drive shaft 88 extending to the other end of the machine. At the opposite end of shaft 88 are beveled gears 89 and 90, the latter fixed upon shaft 82 to drive the same. At the discharge end of the machine a shaft 91 is mounted in bearings 92 on frame pieces 93. The shaft 91 carries a roller 94, preferably composed of rubber. The bearings 92 are adjustable so that the roller 94 can be pressed firmly against the conveyor 40 on pulley 75. At the opposite end of the machine a shaft 95 bearing a roller 96 is similarly mounted in adjustable bearings 97. The bearings 97 are adjusted to hold roller 96 firmly against conveyor 40 on pulley 78. The conveyor 40 is of such length that there is sufficient slack in the upper span of it to avoid interference with the depression of the scale pans, and this slack is kept in the upper span by rollers 94 and 96 preventing conveyor 40 from slipping over pulleys 75 and 78. In order to prevent this slack from forming a loop which might travel along and be squeezed past roller 94 a retarding device, shown in the drawings as a stationary finger 98, is mounted on the frame of the machine in position to bear upon the top of conveyor 40 and hold it lightly against trough 49. This finger keeps most of the slack in conveyor 40 at the receiving end and allows it to be paid out only as required by depression of the scale pans. The speed of conveyor 40 is positively controlled in accordance with the speeds of pulleys 75 and 78.

The slack in conveyors 48 and 52 is taken up by any well known form of belt tightener, as indicated generally at 100.

Instead of the arrangement of the weighing machine shown in Fig. 1 we may use the modified form shown in Fig. 2. In this case the articles are received at the left end of a conveyor 110 and are carried to scales 111 similar to those described above, but set to discharge both standard and over weight articles from conveyor 110 down chute 112 to conveyor 113. The standard and over weight articles are carried by conveyor 113 to scales 114 set to discharge over weight articles down chute 115 to conveyor 116. The under weight articles are delivered by conveyor 110, the standard articles by conveyor 113, and the over weight articles by conveyor 115.

The weight selecting machines described above are accurate and rapid, being capable of selecting such light articles as cigars and cigar bunches, varying only slightly in weight, at a high rate of speed.

Having described our invention,

We claim:

1. In a machine for assorting articles according to weight, an endless conveyor belt, means for frictionally driving said belt, a scale arranged with its pan below and in contact with said conveyor belt, means for keeping a loop of slack in said conveyor belt so that it rests freely upon said scale pan, and selecting means controlled by said scale.

2. In a machine for assorting articles according to weight, two pulleys, an endless conveyor belt trained over said pulleys, a scale arranged with its pan beneath and in contact with one span of said conveyor belt, means for positively driving both of said pulleys at the same peripheral speed, and means pressing said conveyor radially against each of said pulleys, said conveyor being arranged with slack in the span contacting with said scale.

3. In a machine for assorting articles according to weight, two pulleys, an endless conveyor belt trained over said pulleys, a scale arranged with its pan beneath and in contact with one span of said conveyor belt, means for positively driving both said pulleys at the same peripheral speed, and rollers associated with each of said pulleys to press said conveyor belt radially against each pulley.

4. In a machine for assorting articles according to weight, two pulleys, an endless conveyor belt trained over said pulleys, a scale arranged with its pan beneath and in contact with one span of said conveyor belt, means for positively driving both of said pulleys at the same peripheral speed, and rollers having high frictional properties associated with each of said pulleys to press said conveyor belt radially against each pulley.

5. In a machine for assorting articles according to weight, two pulleys, an endless conveyor belt trained over said pulleys, a scale arranged with its pan beneath and in contact with the upper span of said conveyor belt, means for driving said pulleys at a definite speed, means pressing said conveyor against both of said pulleys, said conveyor being arranged with slack in its upper span, and means engaging the upper span of said conveyor belt adjacent the receiving end thereof, to hold back a loop of slack in said upper span.

6. In a machine for classifying articles by weight, a scale having a weighing pan, an endless conveyor belt traveling over said pan and resting thereon, driving means for said conveyor belt comprising a positively driven pulley and a pressure wheel pressing said conveyor belt radially against said pulley, and means cooperating with said pressure wheel to maintain a loop of slack in said conveyor belt, so that it rests freely upon said weighing pan.

CLARENCE J. DU BRUL.
WILLIAM J. LUTTMANN.